United States Patent Office 3,461,092
Patented Aug. 12, 1969

3,461,092
SOLID PARTICULATE PRINTING INK COMPOSITION AND PROCESS FOR PRODUCING SAME
Augustus L. Story, Toledo, Ohio, assignor to Owens-Illinois, Inc., a corporation of Ohio
No Drawing. Filed Aug. 23, 1965, Ser. No. 481,896
Int. Cl. C08g 41/02, 51/52; C09d 11/12
U.S. Cl. 260—28                                    4 Claims The present invention pertains to improved inks. In particular, the instant invention relates to inks that have improved scuff resistance. More particularly, the invention relates to ink compositions which compositions contain organic resins and waxes.

Printing inks are widely used in commerce for printing on paper and paperboard type products, such as bags, set-up boxes, folding cartons, fiber cans and tubes, corrugated and solid fiber boxes, wardrobes and drums and on glass and plastic surfaces. During the printing and during the fabrication of the paper and paperboard products, the printing inks used thereon may show a distinct tendency to scuff. The printed paper or printed paperboard surface may exhibit a pronounced and distinct tendency to scuff when subjected to scuffing and rubbing during handling, warehousing, on the conveyor system, and during transportation where one printed surface on the box rubs against another or against a foreign object. These problems are very serious as the printed product might fail or perform unsatisfactorily under the desired conditions.

Attempts have been made to make printing inks scuff-resistant. Among the possible remedies that have been tried for scuff-resistance are the addition of heavy-bodied, nonscratch varnishes to the inks, the reformulation of the ink with non-scratch vehicles and the elimination of all course-textured or bronzy pigments from the inks. However, these remedies either produced inks that were hard or brittle, or inks that dried to a slightly rough surface which permits abrasion or scuffing. Hence, while some of these prior art attempts have achieved limited non-scuff qualities they have imparted other undesirable properties to the inks. Other prior art remedies have been difficult and expensive to employ and often are ineffective for the intended purpose. Thus, the disadvantages of their use far outweigh the advantages.

It will be appreciated by those skilled in the art that if printing inks are compounded with excellent scuff resistance, the tendency to avoid scuffing would satisfactorily increase the usefulness of the inks. Likewise, it will be appreciated by those skilled in the art that if the ink possesses nonscuffing properties and provides lubricity, the abrading material that comes in contact with the ink surface will have a tendency to slip across the printed surface rather than dig into the ink film. It will be further appreciated by those versed in the art that antiscuff inks with increased lubricity and slip would have a definite commercial value and would also represent a useful contribution to the art.

Accordingly, it is an object of this invention to provide printing inks with increased scuff resistance.

Another object of this invention is to provide printing inks that produce lubricity on the surface of the ink film so that an abrading material will have a tendency to slip across the surface rather than dig into the film.

Still another object of this invention is to provide novel scuff-resistance printing ink compositions.

A still further object of this invention is to provide scuff-resistant, nonabrasive inks for printing on paper and paperboard type products.

Other objects, features and advantages of this invention will become evident from the following detailed description of the manner and mode of practicing the invention.

In attaining the objects of this invention, it has now been surprisingly found that scuff-resistant ink compositions can be made that permit a light film of wax to exudate to the ink film surface. The composition is generally prepared by dry blending a wax, a resin and pigments. After blending, the ingredients are ground thoroughly on a hot three roller mill. Next, the milled ink composition is permitted to harden and then pulverized to a fine powder. The fine powdered ink may be applied by a screen stencil or other means to the surface to be printed whereupon a film of wax exudates to the ink film surface.

The waxes employed in the ink compositions can be animal, vegetable or mineral waxes. Examples of waxes that are operative for the present purpose include tallow, beeswax, carnauba, ouricury, candelilla, paraffin, montan ozokerite and the like. The amount of wax present in the composition is generally about ½ gram to about 5 grams for 100 grams of ink composition. In respect to the polyamide resin the ratio of the wax to the amide resin is about at least 1 to 14 to about at least 1 to 75. On a pound basis, the waxes are incorporated in the amount of at least one-half to at least five ounces to the pound of ink.

The resins suitable for use in the instant invention are of the polyamide type. Polyamides are generally throught of as condensation products which contain recurring amide groups. These resins may be formed by means well known to the art, that is, by the condensation of diamines with diacids. As examples of polyamides may be mentioned ethylenediamine and sebacic acid, propylenediamine and sebacic acid, tetramethylenediamine and adipic acid, tetramethylenediamine and suberic acid, pentamethylenediamine and malonic acid, pentamethylenediamine and octadecanedioic acid, hexamethylenediamine and adipic acid, octamethylenediamine and sebacic acid, decamethylenediamine and oxalic acid and the like. The polyamide resins suitable for use in the present invention include the commercially available polyamide resins, for example, the polyamide resin Scope 30, which is the resinous derivatives of diphenolic acid characterized by a softening point of 98° C. to 102° C., an acid value of 3.75 maximum, an amine value of 8.50 maximum, and a specific gravity of 0.99; the thermoplastic resins known commercially as Versalon, for example, Versalon 1112 as characterized by a softening point of 105° C. to 115° C., a specific gravity of 0.955, and a tensile strength at 75° F. of 1900–2100 p.s.i.; Versalon 1175 as characterized by a softening point of 170° C. to 180° C., a tensile strength of 1950 to 2400 at 75° F. and a specific gravity of 0.925–0.975; and, the commercially available polyamide resins known as Polymid 1144 characterized by an acid value of 3.4, an amine value of 4.8, a melting point of 99° C. to 104° C., and a specific gravity of 0.99; the polyamide resin Polymid 1155 with an acid value of 5, an amine number of 5, a specific gravity of 0.98; the polyamide resin Polymid 1060 with an acid value of 4.0, an amine value of 1–2, a melting point of 112° C. to 113° C. and a specific gravity of 0.97; and the polyamide resin known commercially as Polymid 1074, characterized by an acid value of less than 6, an amine value of less than 6, a melting point of 102° C. to 108° C., and a specific gravity of 0.98. Generally, the polyamide resins used herein will have an acid value of about 3 to 5, and amine value of about 1 to 8.5 and a specific gravity of about 0.92 to 0.99. The amount of resin used will depend on the type of ink being formulated, but will usually be about 40 to about 80 grams for each 100 grams of printing compositions.

The pigments that may be used in the present ink compositions are those which are conventionally used in the printing art. With respect to the pigments, white and colored pigments are compatible with the ingredients of the ink compositions used herein, and the composition may include one or more pigments in the composition. As example of pigments may be cited lithopone, titanium dioxide, zinc oxide, white lead, iron blue, chrome yellows, cadmium yellows, molybdate orange and the like. The organic pigments that can be employed herein include the nitro colors, the azo and diazo colors, the nitroso and isonitroso colors, the oxyketone colors, the ketonimides and hydrazides colors, the triphenylamine colors, the azines, oxazines and thioazines colors, the quinolines, the acridine, the indanthrene, and the phthalocyanines colors. As examples of organic pigments may be mentioned, anthosine B, benzidine yellow, eosine, malachite green, Hansa yellows, methyl violet, peacock blue, Persian orange, phthalocyanine blue, tartrazine and the like. The ink composition may contain at least one inorganic pigment and at least one organic pigment.

The following examples are merely illustrative of the present invention and should not be considered limiting its scope in any way.

EXAMPLE I

An ink composition, with slip imparting characteristics, was prepared as follows: seventy grams of Scope 30 polyamide resin, twenty grams of titanium dioxide, five grams of phthalocyanine blue and five grams of paraffin wax were dry blended with a Waring blendor. After blending, the above blend was ground thoroughly and intimately blended on a hot three roll mill, in a molten state, and at a temperature above the melting point of the resin. Next, the milled composition was permitted to harden to a solid mass, at room temperature. The cooled solid was then pulverized with the above blender and finally ground to a fine powder with a Gem fluid energy mill. Prints, employing the instant composition, were cast by means of a stencil screen on bleached kraft paper. After standing over night it was found that the wax had exudated to the surface of the fused print where it gave excellent slip. The sample print was tested for scuff resistance.

EXAMPLE II

An ink composition was prepared by following the procedure of Example I. The ink composition of this example contained seventy-four grams of polyamide resin Scope 30, twenty grams of titanium dioxide, five grams of phthalocyanine blue and one gram of paraffin wax. The ink powder was printed using a stencil screen on bleached kraft board. Upon fusing the film was hard and glossy with good color. A scuff test was run immediately after the print had cooled.

EXAMPLE III

Employing the composition prepared in Example II, the ink powder was printed using the stencil screen on bleached corrugated board. The print was allowed to age for three days and a very light exudation of paraffin occurred. The sample print was then tested for scuff resistance.

EXAMPLE IV

An ink composition was prepared following the procedure outlined in Example I. Seventy-five grams of polyamide resin, five grams of phthalocyanine blue and twenty grams of titanium dioxide were blended, milled, pulverized and fluidized as before described. The present composition did not contain any wax, and there was considerable rub-off of the ink and bad marring of the print.

EXAMPLE V

Another ink composition was prepared following the procedure outlined in Example I. Seventy-three grams of polyamide resin, Scope 30, twenty grams of titanium dioxide, five grams of phthalocyanine blue and two grams of polyethylene were prepared by following the steps and techniques as above-described. The ink was printed on kraft paper and tested for scuff resistance.

Kraft strips printed in accordance with the foregoing and with the above samples were tested for scuff resistance to evaluate the effectiveness of the respective compositions. The test for scuff resistance that has been set up is to measure the ability of a given printed sample to resist scuffing and is conducted by rubbing flat surfaces of two specimens each against the other. The test is designed to determine whether a printing ink might fail or perform satisfactorily under such conditions. The rub test used to evaluate the scuffing of the printed surface is essentially performed by moving a weighted test strip over a printed test specimen for a predetermined number of strokes. A stroke comprises one complete cycle to and fro motion of the test weight. A four pound weight with a contact pressure of one pound per square inch was employed for evaluating the anti-scuff of the present compositions. The evaluation of the samples showed that the print composition containing the polyamide and the wax, as per Example I, showed excellent slip properties after 900 cycles and that the printing ink composition of Example II, showed excellent scuff resistance at a 1000 cycle level. The above test procedure was also performed for the sample that aged for three days, and this sample also gave excellent slip results comparable to Examples I and II. In contrast, the printing ink compositions of Examples IV and V, which did not contain any wax or contained polyethylene in place of the wax, showed at a level of 500 cycles considerable rub-off and scuffing on the test strip.

The above results clearly establish the unobvious scuff-resistance that is obtained by the present invention. Printing ink compositions that do not contain both the resin and the wax show distinct signs of scuffs, rub-off and ink-marring at a very low order of resistance. Printing ink compositions that contain both the resins and the waxes exhibit excellent slip and antiscuffing at a very high order of resistance. Thus, it is self-evident, from the foregoing results, that the present compositions clearly produce unobvious and unexpected results.

While the illustrative embodiments of the invention have been described with particularity, it will be understood that various modifications will be apparent and can readily be made by those skilled in the art without departing from the scope and spirit of the invention.

What is claimed is:

1. A printing ink composition, said composition being in solid particulate form and consisting essentially of a pigment and a carrier, wherein the carrier consists essentially of an exudative wax selected from the group consisting of animal, vegetable, and mineral waxes and a polyamide resin, wherein said resin has an acid value of about 3 to 5, an amine value of 1 to 8.5 and a specific gravity of about 0.92 to about 0.99, and wherein the ratio of the wax to the polyamide resin in said composition is from about 1 to 14 to about 1 to 75.

2. A composition as defined in claim 1 wherein the pigment comprises at least one inorganic pigment and at least one organic pigment and wherein said pigments are intimately dispersed in the carrier.

3. A composition as defined in claim 1 wherein the carrier contacts essentially of from about one-half gram to about five grams of the wax for each one-hundred grams of printing ink.

4. A process for producing a scuff-resistant solid, particulate printing ink comprising intimately dry blending at least one pigment, a polyamide resin having an acid value of about 3 to 5, an amine value of 1 to 8.5 and a specific gravity of about 0.92 to about 0.99, and an exudative wax selected from the group consisting of animal, vegetable and mineral waxes, wherein the ratio of the wax to the polyamide resin is from about 1 to 14 to about 1 to 75, followed by hot milling the intimate blended composition and then pulverizing the milled composition to a fine powder.

References Cited

UNITED STATES PATENTS

| | | | |
|---|---|---|---|
| 2,989,493 | 6/1961 | Clark et al. | 106—27 XR |
| 3,016,308 | 1/1962 | Maculay | 106—20 XR |
| 3,224,893 | 12/1965 | Floyd et al. | 106—20 XR |
| 3,383,391 | 5/1968 | Carlick et al. | |
| 2,609,380 | 9/1952 | Goldstein et al. | 260—404.5 |
| 3,037,871 | 6/1962 | Floyd et al. | 106—26 |

OTHER REFERENCES

Apps: Manufacture and Testing of Printing Inks, Rollers and Blankets, vol. 1, London, Leonard Hill, 1963, pp. 79–80 ("Polyamide Resins").

Apps: Inks for the Minor Printing Processes and Specialized Applications, vol. 3, London, Leonard Hill, 1963, pp. 23–24 ("Polyamide Inks").

JULIUS FROME, Primary Examiner

JOAN B. EVANS, Assistant Examiner

U.S. Cl. X.R.

106—31, 32, 271; 117—13, 21, 93, 100; 260—28, 39; 264—132